No. 753,275. PATENTED MAR. 1, 1904.
J. L. JOHNSON.
DISK CHUCK.
APPLICATION FILED DEC. 12, 1901.
NO MODEL.
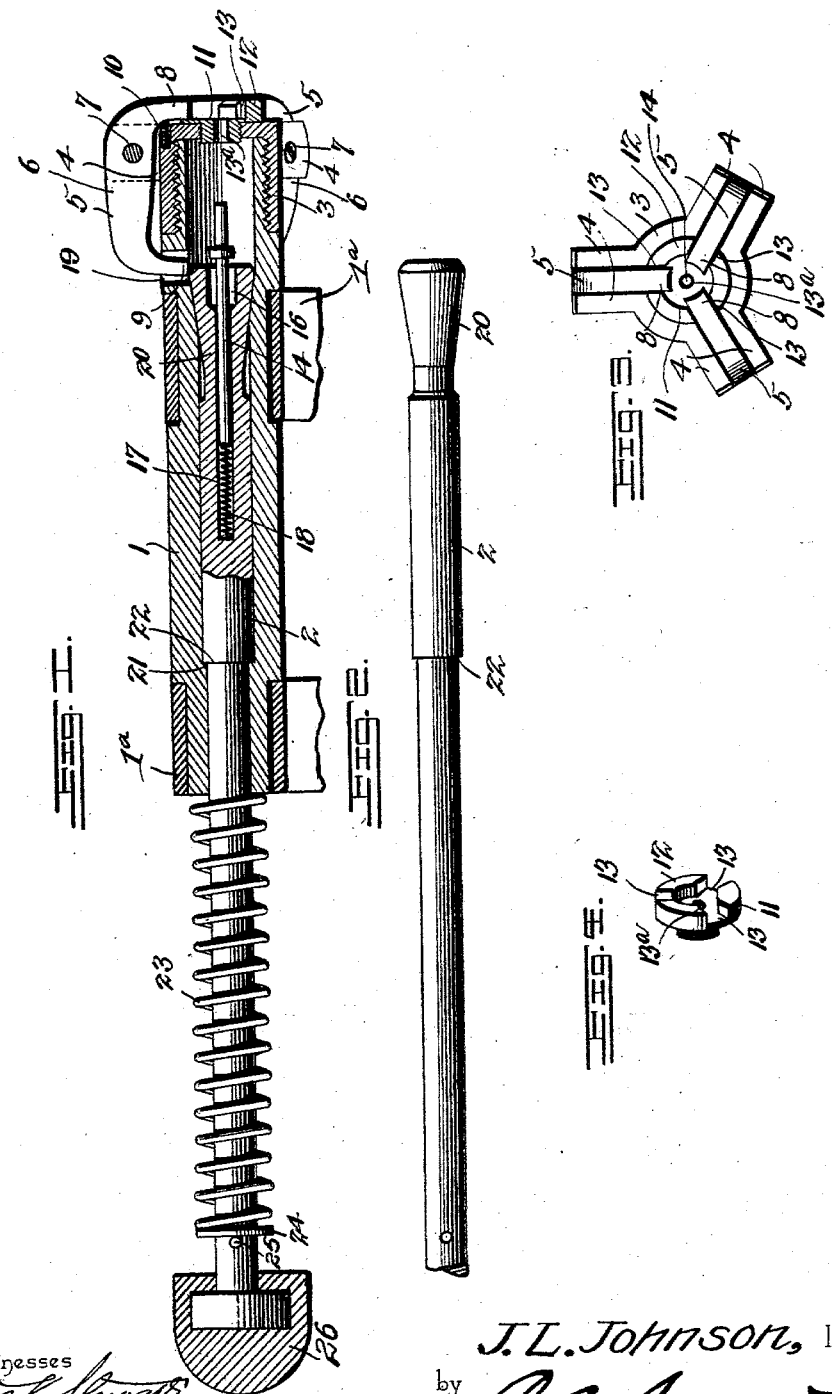

No. 753,275. Patented March 1, 1904.

UNITED STATES PATENT OFFICE.

JAMES L. JOHNSON, OF FORT MADISON, IOWA.

DISK CHUCK.

SPECIFICATION forming part of Letters Patent No. 753,275, dated March 1, 1904.

Application filed December 12, 1901. Serial No. 85,674. (No model.)

*To all whom it may concern:*

Be it known that I, JAMES L. JOHNSON, a citizen of the United States, residing at Fort Madison, in the county of Lee and State of Iowa, have invented a new and useful Disk Chuck, of which the following is a specification.

This invention relates to disk chucks.

The object of the invention is to present a simply-constructed, thoroughly-efficient, durable, and positively-operable form of disk chuck which in use will firmly hold a disk being operated on in position and in which the jaws thereof may be opened while the chuck is running at a high rate of speed to effect release of a finished disk or the insertion of a disk to be operated on.

A further object is to present a chuck having a novel form of ejecting mechanism associated therewith and operating automatically to eject a finished disk by the movement of the part necessary to open the jaws of the chuck.

With these and other objects in view, as will appear as the nature of the invention is better understood, the same consists in the novel construction and combination of parts of a disk chuck, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit of the invention.

In the drawings, Figure 1 is a view in longitudinal section of a chuck characterized by this invention. Fig. 2 is a detached detail view of a mandrel for operating the jaws of the chuck and for carrying the ejector. Fig. 3 is a view in front elevation of the head portion of the chuck. Fig. 4 is a detached detail view in perspective of the disk-socket.

Referring to the drawings, 1 designates the stock of a chuck supported to revolve in the standards 1ª, which form a part of the machine to which the chuck is applied. The stock is provided throughout its length with a centrally-disposed bore, in which works a mandrel 2. The end of the stock which will be the outer one in use is threaded for a portion of its length, and on this threaded portion is screwed the chuck-head 3, the same being provided with three pairs of radially-disposed arms 4, between which are pivoted the chuck-jaws 5. These jaws each comprise an attaching member 6, provided with an opening through which passes a bolt or screw 7 for securing it between a pair of the arms 4, a clamping or work-holding member 8, and an upwardly-disposed toe or projection 9 to engage with the jaw-closing means. The head is provided immediately back of each clamping member with a well or socket in which is housed a coiled spring 10, operating normally to hold the jaws open, so that when the jaws are released by mechanism presently to be described the jaws will automatically open to permit discharge of the disk just operated upon. The outer wall of the chuck-head is provided with a centrally-arranged threaded orifice which is engaged by a disk-socket 11, the socket being provided with an outstanding flange 12, intersected by three recesses 13, in which work the terminals of the work-clamping members 8, as clearly shown in Fig. 3. The disk-socket is provided with a centrally-arranged orifice 13ª, through which is adapted to project when the stock is moved in the direction to release the jaws an ejector 14, the same comprising a metallic rod provided near its outer end with a stop 15 of a size to engage a socket 16, arranged in the outer end of the mandrel, the rear terminal portion of the ejector being housed in an orifice 17 in the said mandrel and bearing upon a coiled spring 18 in the orifice, which operates normally to project the ejector and hold it in the position shown in Fig. 1. The toes or projections 9 of the jaws work in lateral openings 19, formed in the outer portion of the stock, and are adapted to bear upon a cone-head 20, constituting the outer terminal of the mandrel, the portion of the bore of the stock in which the cone-head works being shaped to conform thereto. From the tapered portion of the bore in which the cone-head fits to a point near the rear of the stock the bore is of the same size and thence to the said rear end is slightly reduced in diameter to present a shoulder 21, adapted to be engaged by a shoulder 22, formed by the reduced portion of the mandrel, these two shoulders coacting to limit rearward movement of the mandrel, and upon that portion of the mandrel exterior of the stock is mounted a strong coiled spring 23, one end of which bears against the terminal of the stock and the other end against a disk or washer 24, held against longitudinal movement on the mandrel by a transversely-disposed pin 25, the spring 23 operating normally to hold the cone-head against the toes or projections 9, and thus clamp the disk within the socket 11. It will be observed by reference to Fig. 3 that the clamping members of the chuck-jaws project inward some distance beyond the walls of the disk-socket, and by this arrangement the chuck is adapted for holding disks of any desired size.

In order to conveniently illustrate one method of sliding the mandrel within the stock while the stock is being rotated, I have shown a loosely-mounted knob 26 on the end of the mandrel, which knob can be grasped to force the mandrel and the ejector forward to open the jaws and displace the disk while the chuck is being rotated at a high rate of speed, and the jaws can be held open for the insertion of another disk, which will be clamped as soon as pressure is relieved upon the mandrel.

In the operation of the chuck in placing a disk therein the stock is moved backward on the mandrel against stress of the spring 23, thereby permitting the jaws 6 to open either to release a disk just operated on or to position one therein, this movement causing the ejector to be projected outward through the orifice 13ª of the disk-socket; but owing to the fact that the said ejector is spring-seated, as described, the insertion of a disk in the chuck may be readily effected, and as soon as the stock is released the jaws will instantly close, and thus grip and hold the disk to be operated upon. It is intended that the taper of the cone-head shall be slight, so that the leverage transmitted to the jaws will be considerable.

Having thus fully described my invention, what I claim as new, and desire to secure by Letters Patent, is—

1. The combination with a hollow stock, of a mandrel movable within the stock, a rigid disk-socket carried by the stock and having an outstanding flange intersected by grooves, disk-clamping means carried by the stock and working in the grooves in the socket and means actuated by the mandrel to release the disk.

2. The combination with a stock, of a mandrel, one of said members being movable relative to the other, a disk-socket carried by on of the members and provided with an outstanding flange to receive a disk, means for clamping the disk in the socket, and means actuated by the action of the movable member to displace the disk.

3. The combination with a stock, of a mandrel, one of said members being movable relative to the other, a disk-socket carried by one of the members, and having an outstanding flange intersected by radial slots, disk-clamping jaws movable in the openings and means actuated by the movement of the movable member to release the disk from the engagement of the jaws and socket.

In testimony that I claim the foregoing as my own I have hereto affixed my signature in the presence of two witnesses.

JAMES L. JOHNSON.

Witnesses:
 WM. WINTER,
 W. A. SCHEEF.